US012694682B1

(12) United States Patent
Singh et al.

(10) Patent No.: US 12,694,682 B1
(45) Date of Patent: Jul. 28, 2026

(54) MULTIMODAL VIDEO-LANGUAGE ARTIFICIAL INTELLIGENCE FRAMEWORK FOR SURVEILLANCE ENVIRONMENTS

(71) Applicant: SAI GROUP LIMITED, London (GB)

(72) Inventors: Abhishek Singh, Bareilly (IN); Abhijit Sanyal, West Bengal (IN); Somnath Sinha, London (GB)

(73) Assignee: SAI GROUP LIMITED, London (GB)

( * ) Notice: Subject to any disclaimer, the term of this patent is extended or adjusted under 35 U.S.C. 154(b) by 0 days.

(21) Appl. No.: 19/442,915

(22) Filed: Jan. 7, 2026

(51) Int. Cl.
| | |
|---|---|
| *H01L 29/94* | (2006.01) |
| *G06N 3/0464* | (2023.01) |
| *G06V 20/40* | (2022.01) |
| *G06V 20/52* | (2022.01) |
| *G06V 20/70* | (2022.01) |

(52) U.S. Cl.
CPC ........... *G06V 20/52* (2022.01); *G06N 3/0464* (2023.01); *G06V 20/44* (2022.01); *G06V 20/70* (2022.01)

(58) Field of Classification Search
CPC ........ G06V 20/52; G06V 20/44; G06V 20/70; G06N 3/0464
See application file for complete search history.

(56) References Cited

U.S. PATENT DOCUMENTS

| | | |
|---|---|---|
| 5,965,861 A | 10/1999 | Addy et al. |
| 7,516,888 B1 | 4/2009 | Kundu et al. |
| 7,631,808 B2 | 12/2009 | Kundu et al. |
| 8,564,661 B2 | 10/2013 | Lipton et al. |
| 9,036,028 B2 | 5/2015 | Buehler |
| 9,158,975 B2 | 10/2015 | Lipton et al. |
| 9,473,747 B2 | 10/2016 | Kobres et al. |
| 10,064,502 B1 | 9/2018 | Gyori et al. |
| 10,266,196 B1 | 4/2019 | Sinha |
| 10,268,983 B2 | 4/2019 | Kumar et al. |
| 10,950,099 B1 | 3/2021 | Schoner |
| 10,956,721 B2 | 3/2021 | Tusch |
| 11,302,161 B1 | 4/2022 | Sinha et al. |
| 11,308,775 B1 | 4/2022 | Sinha et al. |
| 11,847,424 B1 * | 12/2023 | Harkous ................ G06N 20/00 |
| 2002/0113123 A1 | 8/2002 | Otto et al. |
| 2003/0040925 A1 | 2/2003 | Gutta et al. |
| 2003/0108099 A1 * | 6/2003 | Nagumo ................... G06T 9/20 |
| | | 375/E7.199 |
| 2004/0130620 A1 | 7/2004 | Buehler et al. |
| 2005/0053294 A1 * | 3/2005 | Mukerjee ............... H04N 19/51 |
| | | 375/E7.125 |

(Continued)

OTHER PUBLICATIONS

Office Action in U.S. Appl. No. 17/401,498 dated Nov. 29, 2021 (12 pages).

*Primary Examiner* — Joseph Suh
(74) *Attorney, Agent, or Firm* — MARSHALL, GERSTEIN & BORUN LLP

(57) ABSTRACT

Methods and systems monitor activity in a surveillance environment. A three-dimensional convolutional neural network is used to extract spatiotemporal features from video frames. A connector module projects the spatiotemporal feature embeddings into a multimodal latent space. A language model analyzes the multimodal embeddings to output structured data which indicates the characteristics of a detected event, and possibly also unstructured data (e.g., a natural language summary). The output may be stored in a database.

20 Claims, 8 Drawing Sheets

300

(56)                References Cited

U.S. PATENT DOCUMENTS

| | | | |
|---|---|---|---|
| 2006/0126962 A1* | 6/2006 | Sun ..................... H04N 19/895 |
| | | | 382/268 |
| 2008/0019589 A1 | 1/2008 | Yoon et al. |
| 2010/0014717 A1 | 1/2010 | Rosenkrantz |
| 2012/0105440 A1* | 5/2012 | Lieberman ............. G06Q 10/10 |
| | | | 345/419 |
| 2012/0320199 A1 | 12/2012 | Kundu et al. |
| 2014/0014722 A1 | 1/2014 | Goncalves et al. |
| 2014/0052555 A1 | 2/2014 | MacIntosh |
| 2014/0161316 A1 | 6/2014 | Golan et al. |
| 2014/0226855 A1 | 8/2014 | Savvides et al. |
| 2014/0368626 A1 | 12/2014 | Archibald et al. |
| 2015/0012396 A1 | 1/2015 | Puerini et al. |
| 2017/0169297 A1 | 6/2017 | Bernal et al. |
| 2017/0200067 A1* | 7/2017 | Zhou .................... G06V 30/194 |
| 2017/0318140 A1 | 11/2017 | Sinha et al. |
| 2017/0323376 A1* | 11/2017 | Glaser ............... G06Q 30/0643 |

| | | | |
|---|---|---|---|
| 2018/0025412 A1 | 1/2018 | Chaubard et al. |
| 2018/0189604 A1* | 7/2018 | Zhang ................. G06V 30/153 |
| 2018/0218351 A1 | 8/2018 | Chaubard et al. |
| 2018/0330196 A1 | 11/2018 | Chaubard et al. |
| 2019/0057435 A1 | 2/2019 | Chomley et al. |
| 2019/0205643 A1 | 7/2019 | Liu et al. |
| 2019/0279185 A1 | 9/2019 | Cheng |
| 2020/0125954 A1* | 4/2020 | Truong ............... G06N 3/0464 |
| 2020/0134701 A1 | 4/2020 | Zucker et al. |
| 2020/0143172 A1 | 5/2020 | Zucker et al. |
| 2020/0151692 A1 | 5/2020 | Gao et al. |
| 2020/0302510 A1 | 9/2020 | Chachek et al. |
| 2021/0217017 A1 | 7/2021 | Scott et al. |
| 2023/0259779 A1* | 8/2023 | Ye ......................... G06F 16/783 |
| 2024/0305711 A1* | 9/2024 | Yekollu .................. G10L 15/26 |
| 2025/0175456 A1* | 5/2025 | Crabtree .............. G06F 16/909 |
| 2025/0225817 A1* | 7/2025 | Ortega Pena .......... G10L 17/14 |
| 2025/0284966 A1* | 9/2025 | Schindler .............. G06N 3/047 |
| 2026/0030286 A1* | 1/2026 | Wytrykus ............ G06F 16/535 |
| 2026/0065807 A1* | 3/2026 | Shah .................... G09B 23/288 |

* cited by examiner

402-A

402-B

602-A

604-A 606-A

602-B

604-B 606-B

MULTIMODAL VIDEO-LANGUAGE ARTIFICIAL INTELLIGENCE FRAMEWORK FOR SURVEILLANCE ENVIRONMENTS

FIELD OF THE DISCLOSURE

The present disclosure generally relates to surveillance environments and, more specifically, to technologies for monitoring, tracking, and analyzing events in such environments.

BACKGROUND

In many environments such as retail, industrial, public, etc., various people frequently interact with each other and/or with objects in the environment. For example, in retail environments, customers and employes may be browsing aisles, making purchases, restocking shelves, and/or performing maintenance. An industrial environment, such as a warehouse, or a public environment, like a public square, may have numerous individuals performing various activities throughout the space at any given time. Given the variety and size of these interactions in different environments, surveillance technologies have been developed to monitor these environments. Monitoring an environment may have multiple objectives, including crime prevention and detection, public and/or workplace safety, and/or employee monitoring. Conventional surveillance techniques rely on rule-based video analytics, which tends to make them inadequate for large and complex environments.

Rule-based video analytics techniques include the use of rule-based algorithms to detect objects, track motion, and/or estimate poses in video clips. However, these rule-based methods have drawbacks which limit their usefulness for most surveillance environments. Some rule-based techniques require handcrafted rules for each scenario. For example, in the case of item concealment, each way an item may be concealed generally requires its own associated rule, which can be impractical for highly dynamic or diverse environments. Further, rule-based techniques may be brittle and struggle to detect objects, motion, and/or poses when conditions change (e.g., changes in lighting, camera angles, crowd density), making them rigid and inapplicable to a wide variety of scenarios. These rigid rules may potentially have a high rate of false positives and/or false negatives, which may further hinder the effectiveness of a detection system. In addition, rule-based systems are unable to generalize effectively, as different rules may be too narrowly tailored to a specific environment.

While rule-based techniques may be impractical for surveillance, they are also limited in their functionality. Rule-based techniques are typically only able to detect objects, without understanding the meaning or context of a scene. For example, a rule-based technique may detect a person, and an object being taken from a shelf and placed under a coat. However, the rule-based technique may be unable to provide any context or semantic meaning for that scene (e.g., if a scene shows a person placing an item under their clothes, rule-based techniques may not be able to provide sufficient context to determine if that action was shoplifting). Further still, the outputs of rule-based techniques are typically not interpretable. Instead, such outputs typically consist of only the raw detections (e.g., flags indicating the presence of some object), without the output context and/or semantic meaning.

Given the complexity of the environments in which many surveillance systems operate, rule-based techniques are often impracticable for effective monitoring and event detection. Thus, there is a need for systems, methods, and techniques that can provide effective monitoring in a wider variety of environments and events, while providing a better understanding of the underlying context associated with a given video sample.

BRIEF SUMMARY

In one aspect, a computer-implemented method for automated surveillance analysis comprises: (1) receiving, by one or more processors, a time series of video frames depicting an environment; (2) generating, by the one or more processors and using a three-dimensional (3D) convolutional neural network, a plurality of spatiotemporal feature embeddings of the time series of video frames; (3) generating, by the one or more processors, a plurality of multimodal embeddings at least in part by projecting the plurality of spatiotemporal feature embeddings into a shared multimodal latent space; (4) generating, by the one or more processors, an output by using a language model to analyze the plurality of multimodal embeddings, wherein the output contains structured data indicating one or more characteristics of an event; and (5) storing, by the one or more processors, the output in a database.

In another aspect, a computing system comprises: (A) one or more processors; and (B) memory storing instructions that, when executed by the one or more processors, cause the computing system to: (1) receive a time series of video frames depicting an environment; (2) generate, using a three-dimensional (3D) convolutional neural network, a plurality of spatiotemporal feature embeddings of the time series of video frames; (3) generate a plurality of multimodal embeddings at least in part by projecting the plurality of spatiotemporal feature embeddings into a shared multimodal latent space; (4) generate an output by using a language model to analyze the plurality of multimodal embeddings, wherein the output contains structured data indicating one or more characteristics of an event; and (5) store the output in a database.

In another aspect, a computer-readable non-transitory storage medium comprises executable instructions that, when executed by a computer system, cause the computer system to: (1) receive a time series of video frames depicting an environment; (2) generate, using a three-dimensional (3D) convolutional neural network, a plurality of spatiotemporal feature embeddings of the time series of video frames; (3) generate a plurality of multimodal embeddings at least in part by projecting the plurality of spatiotemporal feature embeddings into a shared multimodal latent space; (4) generate an output by using a language model to analyze the plurality of multimodal embeddings, wherein the output contains structured data indicating one or more characteristics of an event; and (5) store the output in a database.

DETAILED DESCRIPTION

I. Overview

The embodiments described herein relate to, inter alia, systems, methods, and techniques for detecting, classifying, and/or analyzing events in a surveillance environment. In various implementations, the systems, methods, techniques, etc., use this monitoring/tracking of events to generate structured data representations indicative of those events. The structured data may enable a deeper understanding of loss prevention, improve safety management, gain operational analytics insights, formulate incident response strategies, improve customer service, and/or achieve other goals. Further, the use of structured data may enable integration with other systems, allowing for database storage, audit logging, automated alerts, and/or triggers for downstream systems.

II. Example Surveillance Environment Monitoring and Tracking System

Figure 1:
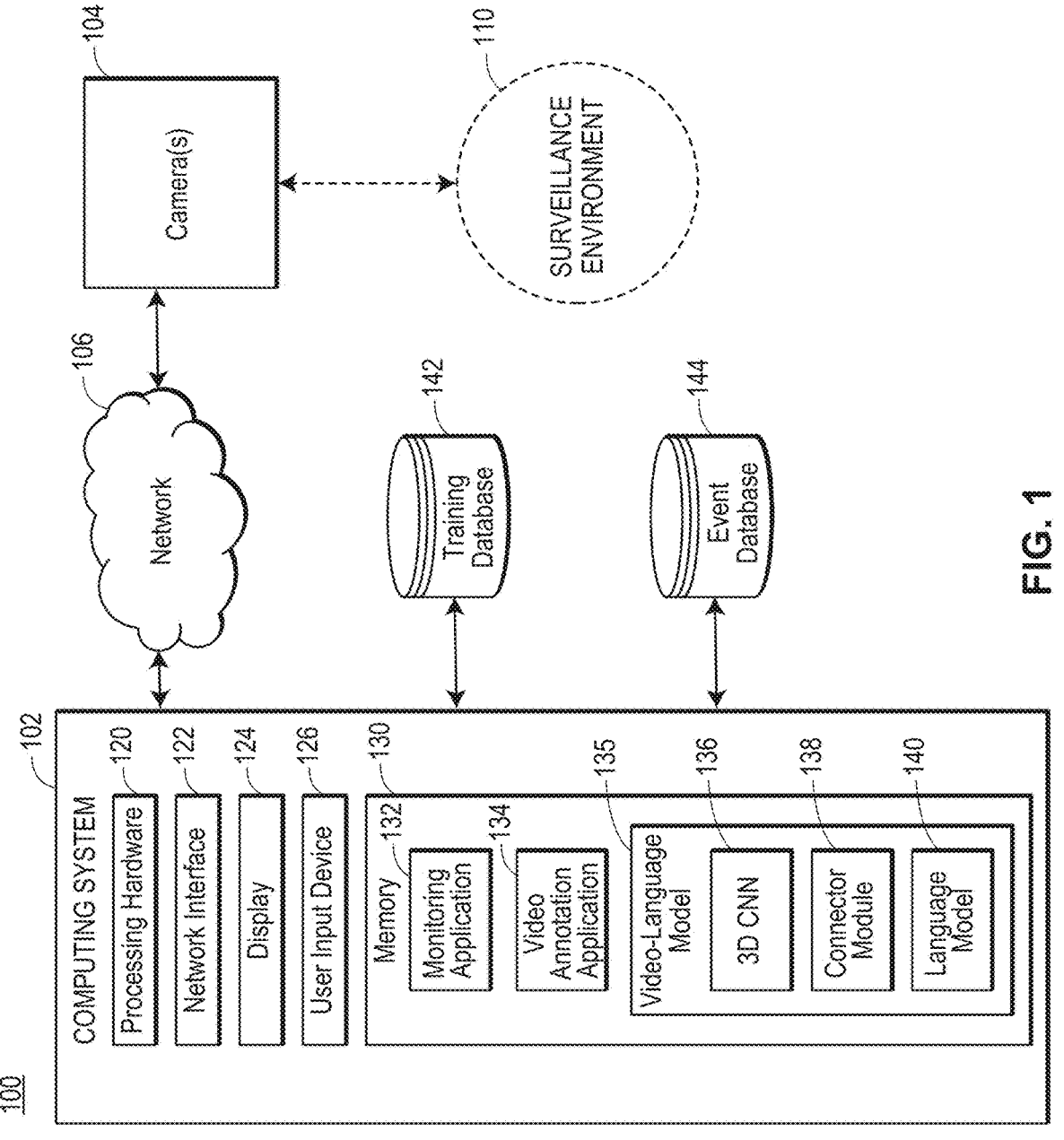
FIG. 1 is a simplified block diagram of an example system that may be used to implement one or more techniques of the present disclosure.

FIG. 1 is a simplified block diagram of an example system 100 that may be used to implement one or more techniques of the present disclosure. The example system 100 includes a computing system 102 communicatively coupled to one or more cameras 104 via a network 106. The network 106 may be a single communication network, or may include multiple communication networks of one or more types (e.g., one or more wired and/or wireless personal or local area networks (PANs or LANs), and/or one or more wide area networks (WANs) such as the Internet if the computing system 102 includes a remote server). The camera(s) 104 are arranged so as to sense/image one or more portions of a surveillance environment 110.

The surveillance environment 110 may be any type of suitable environment, such as a retail environment (e.g., grocery stores, pharmacies, shopping malls), a commercial environment (e.g., banks, office buildings, hotels, restaurants), a transportation environment (airports, train/bus stations, parking facilities), a public environment (e.g., streets, parks, public squares), an industrial environment (e.g., warehouses, distribution centers, factories), and/or a residential environment (e.g., apartment buildings, gated communities), for example. In some embodiments, the surveillance environment 110 includes both public and private facing spaces (e.g., grocery store aisles and a stockroom), and may include indoor and/or outdoor areas (e.g., the interior of a grocery store and its parking lot). The camera(s) 104 may include, or are communicatively coupled to, hardware configured to communicate the captured images (e.g., a video feed) to the computing system 102 via the network 106. The camera(s) 104 may be part of a closed-circuit television (CCTV) system that includes analog and/or digital cameras, for example.

The computing system 102 may be in or near the surveillance environment 110 (e.g., an on-site server, desktop computer, laptop computer, or tablet computer), or may be remote from the surveillance environment 110 (e.g., a web server of a company providing a commercial service). The computing system 102 may be a single computing device, or a collection of distributed (i.e., communicatively coupled local and/or remote) computing devices and/or systems, depending on the embodiment.

The computing system 102 includes processing hardware 120, a network interface 122, a display 124, a user input device 126, and memory 130. The processing hardware 120 includes one or more processors, each of which may be a programmable microprocessor that executes software instructions stored in the memory 130 to execute some or all of the functions of the computing system 102 as described herein. The processing hardware 120 may include one or more central processing units (CPUs) and/or one or more graphics processing units (GPUs), for example. In some embodiments, the processing hardware 120 includes one or more buses (e.g., a system bus, expansion card) to facilitate communication between processing components, such as a CPU and GPU. In further embodiments, however, a subset consisting of one or more of the processors in the processing hardware 120 may include processors that do not execute software instructions (e.g., application-specific integrated circuits (ASICs), field-programmable gate arrays (FPGAs), etc.).

The network interface 122 may include any suitable hardware (e.g., front-end transmitter and receiver hardware), firmware, and/or software configured to use one or more communication protocols to communicate with external devices and/or systems (including at least the camera(s) 104) via the network 106. For example, the network interface 122 may be or include an IEEE 802.11 WLAN or Ethernet interface.

The display 124 may use any suitable display technology (e.g., LED, OLED, LCD, etc.) to present information to a user, and the user input device 126 may include a keyboard, mouse, microphone, and/or any other suitable input device or devices to enable user inputs to the computing system 102. In some embodiments, the display 124 and the user input device 126 are at least partially integrated within a single device (e.g., a touchscreen display). Generally, the display 124 and the user input device 126 may collectively enable a user to view and/or interact with visual presentations (e.g., graphical user interfaces, alert messages, video feeds from the camera(s) 104, and/or other information) output by the computing system 102.

The memory 130 may include one or more volatile and/or non-volatile memories. Any suitable memory type or types may be included in the memory 130, such as a read-only memory (ROM) and/or a random access memory (RAM), a flash memory, a solid-state drive (SSD), a hard disk drive (HDD), and so on. Collectively, the memory 130 may store the instructions of one or more software applications, the data received/used by those applications, and the data output/generated by those applications. In the example system 100, the memory 130 stores the software instructions of a monitoring application 132, as well as one or more three-dimensional convolutional neural networks (3D CNNs) 136, a connector module 138, and a language model 140. The monitoring application 132 may generate/provide a user interface (UI) for user interaction and configuration.

Figure 6A:
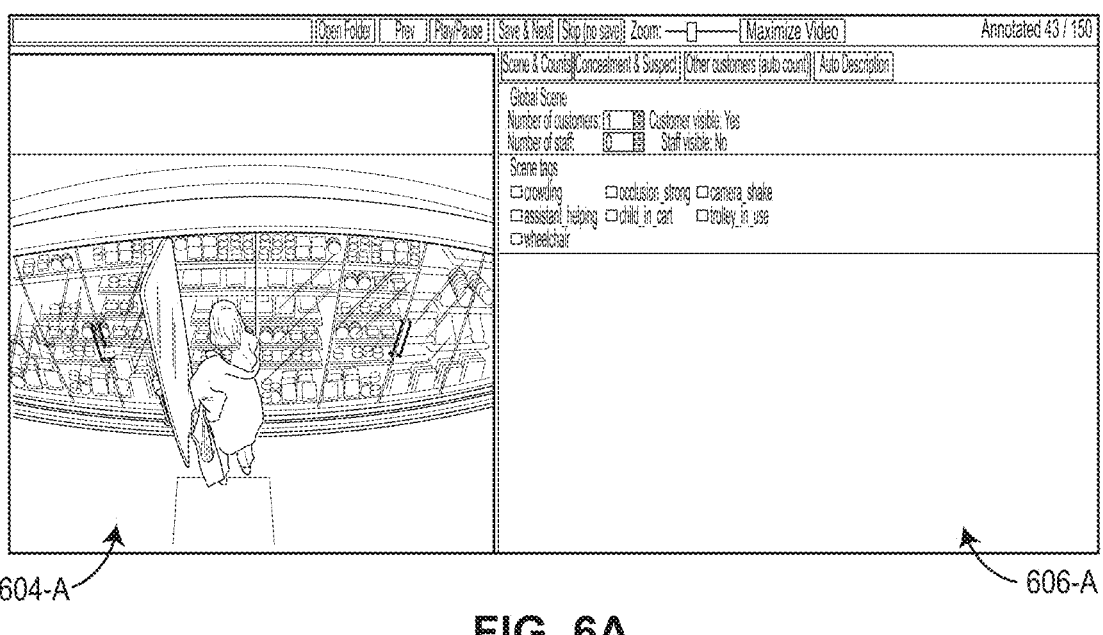
FIGS. 6A and 6B depict user interfaces of an example video annotation application.
Figure 6B:
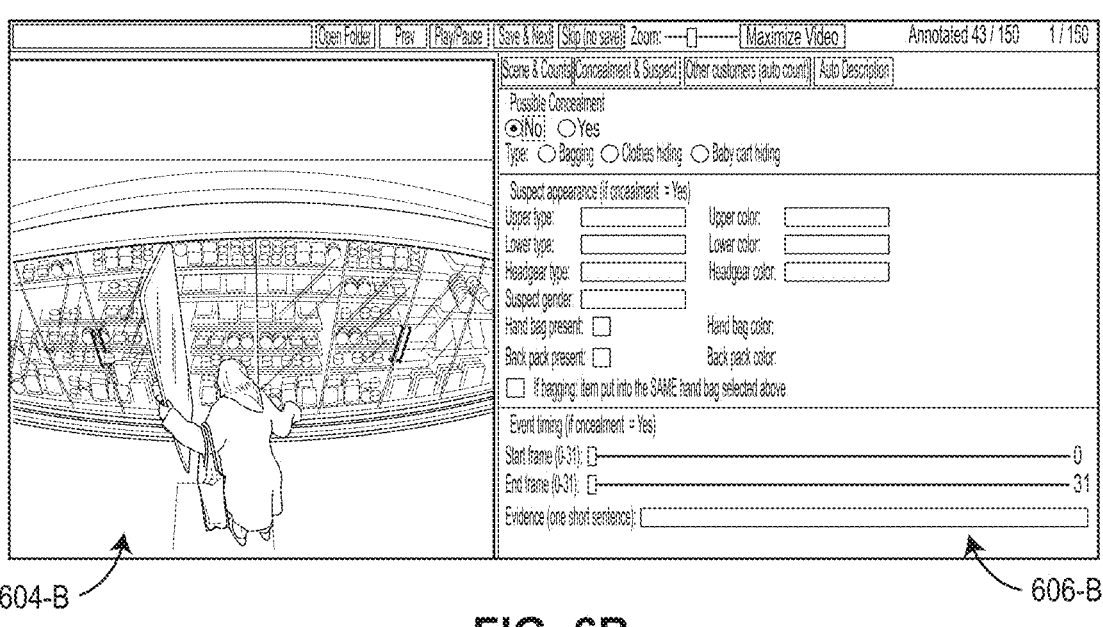

The memory 130 of the example system 100 also stores the software instructions of a video annotation application 134. The video annotation application 134 may be a software application that enables users to label surveillance video with specific events and/or characteristics to create training data for a video-language model 135, discussed below. Each event may be associated with one or more depicted objects. In some embodiments, a particular type of object may correspond to a specific type of event. For example, a weapon may be a factor indicative of a violent event or other dangerous situation, but no other event type. In other embodiments and/or scenarios, a specific type of object may correspond to multiple events. For example, the presence of a shopping cart or trolley may be a factor indicative of one or more permissible shopping events (e.g., placing groceries in a cart), but also a factor indicative of item concealment (e.g., if some items are placed in the shopping cart in an atypical manner). The video annotation application 134 may include text-entry fields, checkboxes, sliders, and/or dropdown menus that enable manual (user-entered) event and/or event characteristic labeling. Examples of events may include an item selection event (e.g., picking a retail item off a store shelf), an item concealment event (e.g., placing a retail item within a personal conveyance or clothing), a self-checkout event, a cashier checkout event, an item restocking event, a customer assistance event, a staff maintenance event, and so on. Examples of event characteristics may include characteristics indicative of a concealment mechanism (e.g., an item being under a piece of clothing, or in a cart), characteristics indicative of clothing worn (e.g., type of clothing such as hats, coats, pants, shorts, etc.), characteristics indicative of gender, characteristics indicative of hair color, characteristics of clothing (e.g., color of clothes, a type of clothing, condition of clothing), or characteristics of personal affects (e.g., a purse, sunglasses, a cell phone). In some embodiments, the text-entry fields provided by the video annotation application 134 (for event labeling and/or for characteristic labeling) are partially or fully configurable via one or more UIs. Examples of UIs that may be provided by the video annotation application 134 are shown in FIGS. 6A and 6B.

The memory 130 of the example system 100 further stores the video-language model 135. The video-language model 135 is a machine learning (ML) system that processes video frames to output data indicative of context-specific events, leveraging both video and language processing capabilities. The video-language model 135 outputs structured data indicative of the characteristics of an event, and possibly also unstructured data (e.g., a human-readable summary), as discussed further below. The video-language model 135 may include multiple components, such as the 3D CNN 136, the connector module 138, and the language model 140.

The monitoring application 132 may process video frames from the camera(s) 104 for objection recognition and other purposes. The monitoring application 132 may receive video frames as raw pixels that are not readable by the language model 140, and relevant features (e.g., objects, actions, spatial relationships) may be extracted from the raw pixels. To perform this feature extraction, the monitoring application 132 may utilize the 3D CNN 136 stored in the memory 130. The 3D CNN 136 is configured to capture both spatial and temporal patterns present in a video. The 3D CNN 136 may include convolution, pooling, flattening, and fully connected layers, for example. In some embodiments, the 3D CNN 136 includes hundreds or thousands of layers, and tens of thousands or hundreds of thousands of thousands of neurons, for example. In some embodiments, the 3D CNN 136 is trained on publicly available video datasets that are directed to action/motion detection (e.g., Kinetics, UCF101, etc.). In other embodiments, the 3D CNN 136 is trained on video repositories training data specific to the surveillance environment 110. This training data may be stored in the training database 142. This may include training data configured using the video annotation application 134 discussed with relation to FIG. 5, for example.

The 3D CNN 136 is configured to output spatiotemporal embeddings of video frames. To transform these embeddings into multimodal embeddings, the monitoring application 132 employs the connector module 138. The connector module 138 may be a neural network component that uses a linear projection layer to transform embeddings from their original embedding space into a multimodal latent space. The linear projection layer uses a weight matrix, learned during training, to transform the spatiotemporal embeddings into multimodal embeddings, and a bias vector to adjust the transformed embedding into the multimodal embedding space. Further, the connector module 138 may use a normalization layer to adjust the transformed embeddings into a standard scale or range, thereby enabling more consistent and stable processing. The output of the transformation by the connector module 138 is a set of multimodal embeddings that are projected into a multimodal latent space and are compatible with the language model 140.

The monitoring application 132 may use the language model 140 to interpret and analyze the multimodal embeddings. The language model 140 may be a large language model (LLM) or a small language model (SLM), for example. In some embodiments, the language model 140 is a pretrained language model (e.g., ChatGPT®, Gemini®, Qwen®) further trained with the annotated training video from the video annotation application 134 and/or fine-tuned using question-answer (QA) pairs that are specific to the surveillance environment 110 (e.g., specific to retail, commercial, industrial, etc.). The language model 140 may perform contextual reasoning using the multimodal embeddings to generate an output comprising structured data which represents event characteristics. In some embodiments, this output comprises a JavaScript Object Notation (JSON) object, a free-form text object, or both.

In some embodiments, the computing system 102 uses the single monitoring application 132, and the same 3D CNN 136, connector module 138, and language model 140, for multiple use cases (e.g., for monitoring aisles and for monitoring a stockroom of a grocery store), or only supports a single use case. In other embodiments, the monitoring application 132 uses different 3D CNNs of video-language model 135 (each similar to 3D CNN 136), different connector modules video-language model 135 (each similar to connector module 138), and/or different language models video-language model 135 (each similar to language model 140) for different use cases. In still other embodiments, the monitoring application 132 uses a different video-language model 135 for each of two or more different use cases (e.g., different video-language models, each similar to video-language model 135, for aisles and for a stockroom). In still other embodiments, the memory 130 stores distinct monitoring applications similar to monitoring application 132 for different use cases (e.g., a first monitoring application for aisles and a second monitoring application for a stockroom).

In some embodiments, the computing system 102 is communicatively coupled to, or includes (e.g., in the memory 130), a training database 142 and an event database 144. The training database 142 includes video frames, and corresponding labels, that the computing system 102 (or another computing system not shown in FIG. 1) may use to train one or more components of the video-language model 135 (e.g., 3D CNN 136, connector module 138, and/or language model 140). In some embodiments, these include the labeled video segments, labeled video frames, or labeled video frame portions generated by the video annotation application 134 based on user inputs.

The event database 144 includes a digital record of events, in the surveillance environment 110, that are detected by the computing system 102 when executing the monitoring application 132. In some embodiments, for example, the monitoring application 132 adds every event detection in a time series of video frames to the event database 144. Any other type of information described herein (e.g., any output of any component of the monitoring application 132, such as the spatiotemporal feature embeddings generated by the 3D CNN 136) may also be stored in the event database 144. In some embodiments, the event database 144 stores event characteristics in a relational or graph database.

The databases 142 and 144 may each be single or distributed databases and may each be stored in one memory or distributed across multiple memories and/or systems. In some embodiments, the training database 142 and/or the event database 144 are remote databases that are directly accessed by one or more servers that are remote from (and communicatively coupled to) the computing system 102. For example, the computing system 102 may remotely access the training database 142 to train the video-language model 135. In another example, a remote server may locally access the training database 142 to train the video-language model 135 before providing the video-language model 135 to the computing system 102.

III. Example Surveillance Environment

Figure 2:
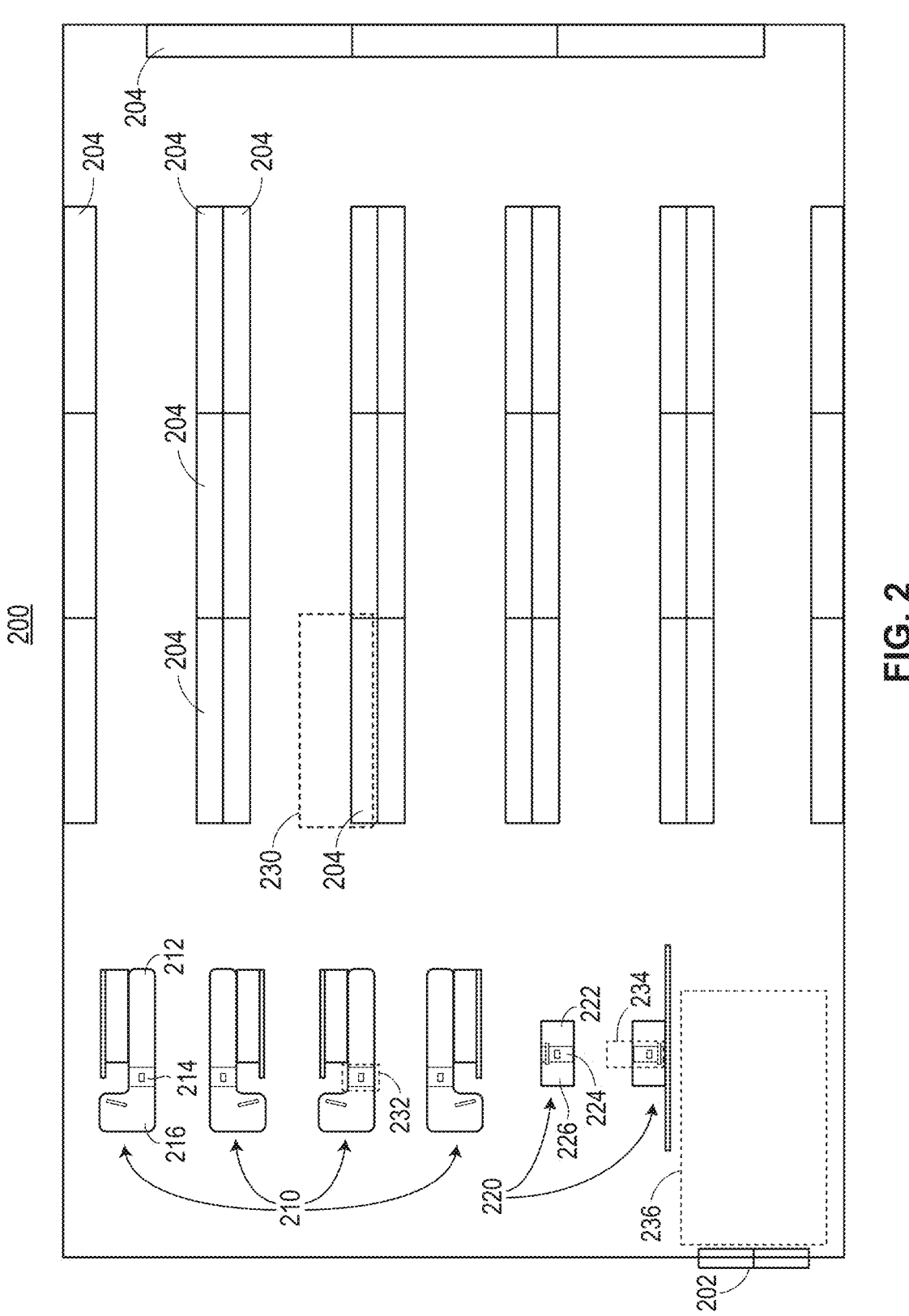
FIG. 2 is a simplified diagram of an example surveillance environment with example areas of interest.

One example of the surveillance environment 110 is shown in FIG. 2 as a retail environment 200. It is understood that the surveillance environment 110 may be any sort of indoor and/or outdoor space where activity and/or human interactions may occur, and that the retail environment 200 is shown merely as a reference for certain examples below.

In the retail environment 200, an entry/exit 202 allows customers to enter and exit the retail environment 200, and a number of display areas 204 (only a subset of which are numbered/labeled in FIG. 2, for clarity) include shelving and/or other structures that allow customers to see and access (pick up) inventory items (e.g., food and/or other products). In the example shown, the display areas 204 are arranged so as to form aisles of a sort that are common in retail stores.

The retail environment 200 also includes four employee checkout stations 210 at which store employees scan items for customers (and possibly bag those items as well). Each employee checkout station 210, in this example, includes a loading area 212 (e.g., having a conveyor to move items towards the employee), checkout scanning equipment 214 the employee uses to scan each item, and a pick-up area 216 from which customers can pick up their items after paying for those items. The retail environment 200 also includes two self-checkout stations 220 at which customers can scan their own items, with or without some level of supervision by store security personnel. Each self-checkout station 220 includes a loading area 222, checkout scanning equipment 224, and a pick-up area 226, which may be similar to the loading area 212, checkout scanning equipment 214, and pick-up area 216, respectively, of the employee checkout station 210.

In some embodiments, the computing system 102 executes the monitoring application 132 to monitor and track events in one or more specific "areas of interest" in the surveillance environment 110, rather than the entire surveillance environment 110. Generally, for a retail environment 200, the areas of interest are areas in which important or relevant customer activity is likely to occur (e.g., hiding inventory items in jackets or personal bags, bypassing the scan at the checkout, exiting the store, etc.). The areas of interest may be restricted to locations covered by a legacy camera (e.g., CCTV) system that is already in place, for example. In the retail environment 200, for instance, one or more cameras may be arranged/directed so as to cover an area of interest for each of one, some, or all of the display areas 204. One such area is depicted in FIG. 2 as area of interest 230. Each area of interest 230 may be monitored using a ceiling-mounted or rafter-mounted camera located directly above a display area 204 on the opposite side of the aisle, for example.

Another example area of interest 232 covers the checkout scanning equipment 214 at each of the employee checkout stations 210. This coverage may be useful for preventing employee-assisted theft (e.g., the employee placing an item in a customer's bag without first scanning the item), for example, or merely to track and better understand operation/usage of the employee checkout stations 210, etc. Another, similar area of interest 234 covers the checkout scanning equipment 224 at each of the self-checkout stations 220. This coverage is useful for preventing customer attempts to bypass the scan of (and thus payment for) inventory items, or merely to track and better understand operation/usage of the self-checkout stations 220, etc. Each area of interest 232 or 234 may be monitored using a wall-mounted, ceiling-mounted, or rafter-mounted camera, for example.

Yet another example area of interest 236 covers a portion of the retail environment 200 that customers must (or very likely would) pass through in order to exit (and possibly enter) the retail environment 200. This coverage is useful, for example, to confirm when a suspicious action by a customer (e.g., placing an inventory item in his/her pocket) is an actual shoplifting attempt, or merely to track and better understand patterns of traffic flow into and/or out of the retail environment 200, etc. The area of interest 236 may be monitored using a wall-mounted, ceiling-mounted, or rafter-mounted camera, for example.

IV. Model Architecture

Figure 3:
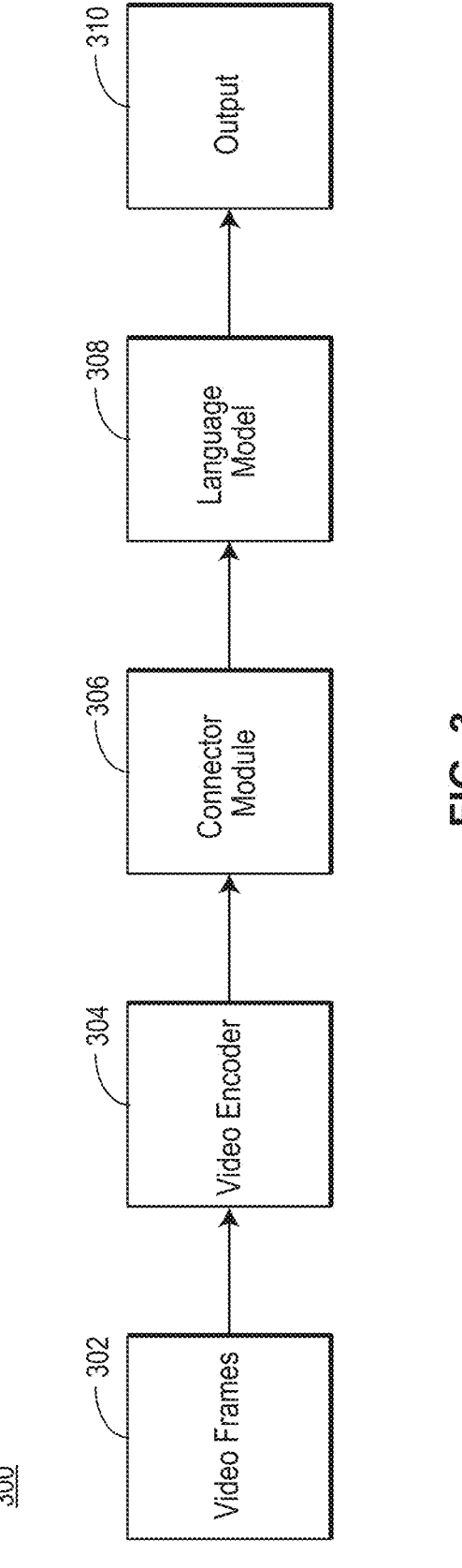
FIG. 3 depicts a block diagram of a model architecture that may be used to implement one or more techniques of the present disclosure.

FIG. 3 depicts a block diagram of a model architecture 300 that a computing system (e.g., the computing system 102 when executing the monitoring application 132) may use when monitoring the surveillance environment 110. For ease of explanation, the model architecture 300 will be described with reference to components of the example system 100 of FIG. 1 and the retail environment 200 of FIG. 2, although the model architecture 300 may instead be implemented by other systems and in other surveillance environments 110.

The monitoring application 132 uses the model architecture 300 for automated surveillance video analysis. The model architecture 300 comprises three components: a video encoder 304 (a 3D CNN, e.g., augmented with self-attention layers), a connector module 306 (e.g., a neural network component comprising linear projection layers and normalization layers), and a language model 308 (e.g., an LLM). The video encoder 304, connector module 306, and language model 308 may be, respectively, 3D CNN 136, connector module 138, and language model 140 of FIG. 1, for example.

The computing system 102 receives and ingests video frames 302 from at least one camera 104 that captures video of an area of interest in an example system 100, (e.g., the area of interest 232 or 234 in the retail environment 200 of FIG. 2). Video ingest may include file paths from pre-recorded video files (e.g., MP4, .avi, .mov) stored on either local, external, or network-based memory. In addition, the computing system 102 may receive video frames through real-time streaming protocol (RTSP), such that computing system 102 ingests continuous video from live-streaming camera feeds.

The monitoring application 132 uses the video encoder 304 to capture spatiotemporal feature embeddings from the ingested video frames. The video encoder 304 may use its 3D CNN layers to perform feature extraction. The video encoder 304 may, for example, use convolutional layers of the 3D CNN to extract spatiotemporal features and max pooling layers of the 3D CNN to reduce spatiotemporal dimensions. For example, a time sequence of video frames captured from the retail environment 200 may depict a person grabbing an item from one of the display areas 204 and placing it under his or her clothing. The video encoder 304 may initially extract low-level features using a first convolutional layer. These low-level features may include edges, such as the edges of a shelf in one of the display areas 204, the outline of the person, and/or the edge of a product's packaging. Further, the first convolutional layer may capture other low-level features, such as colors and color transitions, simple textures (e.g., a smooth surface, a rough surface, a repetitive pattern), and/or basic motion (e.g., pixels shifting certain directions), for example. Once the low-level features are extracted by the first convolution layer, a max pooling layer reduces spatiotemporal dimensions while still keeping relevant extracted features. Max pooling layers help maintain translational invariance (e.g., ensure that small shifts in pixels do not strongly change the extraction by a further convolution layer), discard noise (e.g., ignore irrelevant data), and reduce computational size for further processing. After the first max pooling layer reduces spatiotemporal features, further convolutional layers may extract mid-level and high-level features, coupled with further max pooling layers to further reduce spatiotemporal dimensions. Mid-level features may include body parts (e.g., hands, a face), object parts (e.g., the wheels of a shopping cart, brackets on shelf), object interactions (e.g., hands near an object, items in a cart), and/or motion patterns (e.g., reaching, walking, bending). High-level features may include whole objects (e.g., a person, a shopping cart, a product), complete actions (e.g., concealment, shopping, paying), behavioral patterns (e.g., suspicious behavior, aggressive behavior), and/or contextual understanding (e.g., a determination of how busy the retail environment 200 is), for example.

The 3D CNN of video encoder 304 may include one or more self-attention layers. After the video frames have been processed by the convolutional and max pooling layers, in some embodiments, the self-attention layers may define relationships across a time series of video frames. For example, the extracted features from the 3D CNN may include a hand and a cart, and self-attention layers may transform these isolated features into features that are connected to each other. The example of the hand and the cart, along with motion enables for these isolated features to become a connected event, such as item extraction. Self-attention layers may use tokens to represent positions within each video frame. A token is a set of characters that function as semantic translations for a model. These tokens may represent queries or information that are/is relevant to queries. Tokens may then be matched to determine relevance, transforming isolated spatiotemporal features, into connected spatiotemporal features.

Once the extracted spatiotemporal features are connected, in some embodiments, a normalization layer is used to add stability and preserve spatiotemporal features. In further embodiments, a global pooling layer of video encoder 304 may further reduce spatiotemporal dimensions. The result of the time series of video frames processed by the video encoder 304 is a set of spatiotemporal feature embeddings that represent relevant information and context from the time series of video frames.

The spatiotemporal feature embeddings are projected into a shared multimodal latent space by a connector module 306. In some embodiments, the connector module 306 is trained alongside the other components of the model architecture 300. Without the use of a connector module 306, the spatiotemporal embeddings may be incompatible with the language model 308. The connector module 306 creates the shared multimodal latent space, allowing for both spatiotemporal and semantic representations of the time series of video frames to exist in the same space. To project the spatiotemporal feature embeddings into a shared multimodal latent space, the connector module 306 uses a linear transformation. First, connector module 306 transforms the spatiotemporal feature embeddings with a learned weight matrix, which maps spatiotemporal features to language concepts. The values of the weights control how much the respective input features affect the value of an output feature. For example, a hand motion may have a higher weight relative to other movements to represent that the former is a more significant indicator of a particular action (e.g., a hand motion is more significant for an item concealment than a kicking motion). In addition, the connector module 306 may use a bias vector to adjust the transformation values produced by the weight matrix to ensure the projected multimodal embeddings can be used by the language model 308.

The language model 308 may analyze the multimodal embeddings. To do so, the language model 308 may use one or more pre-defined prompts that direct the analysis of the language model 308 and specify the desired format of the language model 308 output. For example, a prompt may direct the language model 308 to only look for item concealment events and output a "yes" if concealment was found or a "no" if no concealment was found. In some embodiments, the language model 308 uses a hierarchy of layers to progressively learn basic associations, semantic relationships, and complex reasoning. In an illustrative example, the multimodal embeddings may encode information corresponding to concealment, with initial layers of the language model 308 determining that the embeddings have concealment patterns, later layers of the language model 308 determining how the concealment is happening and/or what is being concealed, and final layers of the language model 308 providing a comprehensive understanding of the concealment that can be reflected in the generated output.

The language model 308 generates an output 310. The output 310 may consist of only structured data. Structured data may include data organized in a predefined format with fixed fields and values. In some embodiments, the output 310 also includes unstructured data. Unstructured data may be free-form text without a predefined format.

In some embodiments, the structured data of the output 310 includes one or more JSON objects. A JSON object is a text-based format for representing structured data that is both machine and human readable, and may include numbers, strings, and/or Booleans. The JSON object may be indicative of the context of the event, activity detected during the event, and/or temporal information associated with the event. For example, a JSON object (of output 310) associated with a concealment event may be:

```
"json {"detection_id": "DET-2025-0115-001", "timestamp": "2025-01-
15T14:32:15Z", "camera_id": "aisle_3", "num_customers": 1, "num_staff":
0, "concealment": {"detected": true, "type": "cart", "confidence": 0.95,
"frames": {"start": 105, "end": 233, "duration": 125}}, "suspect":
{"gender": "Female", "appearance": {"top_color": "Blue",
"bottom_color": "Black"}, "accessories": {"handbag": false,
"backpack": false}}.
```

This example JSON object includes numerical values, strings, and Booleans to indicate a detection ID, a time-stamp, a camera ID, the number of customers, the number of staff, and concealment related parameters. The concealment related parameters include detection (e.g., whether conceal-ment was detected), the concealment type (e.g., how the concealment was performed), the confidence/probability that concealment occurred, the frames where the conceal-ment occurred and the duration in the number of frames of the concealment, and the suspect characteristics. The suspect characteristics include the suspect gender, the suspect appearance (e.g., a description of the clothes the suspect was wearing), and accessories worn by the suspect (e.g., whether the suspect had a handbag, whether the suspect had a backpack, etc.). In other embodiments and/or scenarios (e.g., other configurations), the JSON object may include more, fewer, and/or different parameters.

In some embodiments, the output 310 also includes a free-form text description that includes a description of the context of the event, activity detected during the event, and/or temporal information associated with the event. The free-form text description may be a natural language description of the event characteristics, which can be easily understood by a human reader, for example. In some embodiments, the language model 140 generates the free-form text description from the JSON object. In the example of the JSON object shown above, a free-form text output for a concealment event may be:

1 female customer wearing a blue top was detected
        concealing items using a cart.
    Event occurred from frame 105 to frame 233.

In certain embodiments, the language model 308 outputs the unstructured data of output 310 in the form of a natural language summary. The language model 308 may generate the JSON object and natural language summary based on one or more auto-generated prompts (e.g., generated or retrieved by monitoring application 132). For example, monitoring application 132 may sequentially input two prompts to the language model 308. In such embodiments, a first prompt may include instructions on how to generate the structured data (e.g., by specifying the specific structured data parameters such as gender, type of concealment, etc.). Thereafter, a second prompt may include or reference the structure data output by language model 140 responsive to the first prompt, with the second prompt including instruc-tions to summarize the structured data (e.g., in a particular manner and/or format). For example, the instructions of the second prompt may direct the language model to provide a summary with a certain level of conciseness, to use or avoid using certain types of words, etc. In an alternative embodi-ment, monitoring application 132 may use a single prompt to instruct the language model 308 to generate the structured data, and also to generate the natural language summary based on the structured data. In either embodiment, the language model 308 may tokenize the structured data and process the tokens to generate a free-form text description/summary.

Thus, the summary generated by the language model 308 may transform the structured data indicative of captured event characteristics into human-readable formats. For example, a slip and fall event may include a hazard, a location, and a person, with the structured data of the event including each characteristic in its own field. The summary of this event may include each of the characteristics in a readable format, such as "One male attendant slipped and fell in a puddle of water located in Aisle 4." Different prompts may produce different versions of a summary. In a further example, a prompt may include directions for the summary to include a recommended action. For example, the language model 308 may output, based on this prompt, text such as "Please cleanup and close Aisle 4 due to hazard." The use of the natural language summaries may increase human readability instead of relying on structured data, improve flexibility (e.g., because the format of the free form-text description may be user-configured based on a use case), and/or provide a basis for actionable outputs.

In some embodiments, the output 310 may be stored in a database (e.g., the event database 144 of FIG. 1) for further analysis. For example, the computing system 102 may use the output 310 with other aggregated outputs to perform a statistical analysis (e.g., an analysis of how many specific types of events occurred, how often a certain characteristic was present in a specific event type, etc.). In other embodi-ments, the computing system 102 may store the output 310 in such a database so that a physical action may be per-formed. A computer system (e.g., the computing system 102 of FIG. 1) may perform the physical action in response to the output 310. For example, if the output 310 indicates an item concealment event, the computing system 102 may cause a door to be automatically locked (e.g., by triggering or sending a control signal to another device or system that includes an electronically controllable door lock actuator). In another example, for an output 310 that includes an aggression event, the computing system 102 may trigger an alarm.

The model architecture 300 can provide a unified under-standing of visual and language/semantic information, incorporating both visual perception and language reasoning without the need for separate pipelines or systems. Further, the model architecture 300, through the use of both the video encoder 304 and the language model 308, can perform contextual reasoning to understand how events and/or event characteristics relate to one another. In addition, unlike rule-based techniques, the model architecture 300 may respond to different queries and/or prompts for different use cases without handcrafted rules. The model architecture 300 may also handle ambiguous and complex events and/or event characteristics that rule-based techniques generally cannot effectively analyze. This enables scalability to new tasks and environments. Further still, the dual outputs allow for both machine and human understanding.

Figure 4A:
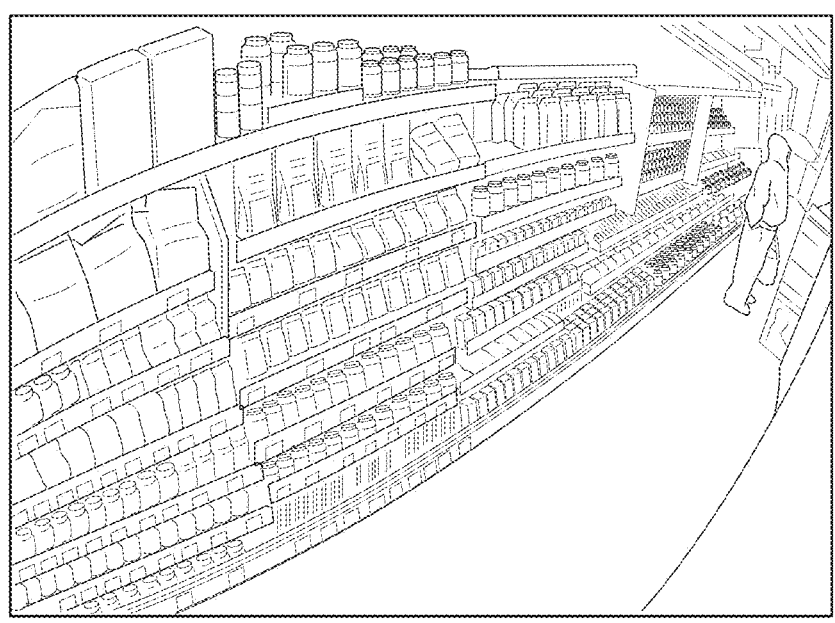
FIGS. 4A and 4B depict example video frames captured within a surveillance environment.
Figure 4B:
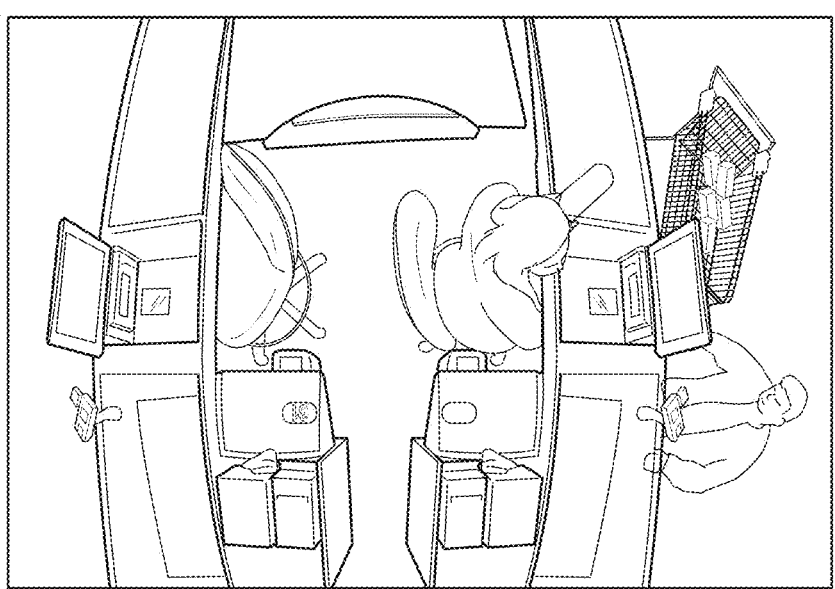

FIGS. 4A and 4B depict example video frames 402-A and 402-B, respectively, that may have been captured (e.g., by cameras of camera(s) 104) in a surveillance environment such as the surveillance environment 110. Specifically, video frames 402-A and 402-B are video frames captured in an example retail environment. Video frame 402-A depicts a display area and video frame 402-B depicts an employee checkout station. The monitoring application 132 may ana-lyze the video frames 402-A and 402-B, and surrounding video frames, in the manner discussed above (in connection with FIG. 3) to determine whether any events (e.g., as specified in the prompt) took place. When (e.g., in response to) the monitoring application 132 detects an event, the computing system 102 may present, via the display 124, the output structured data (e.g., JSON object) and free-from text description, possibly along with the portion of video (i.e., video frames) that correspond to the event.

V. Example Training Data Flow

Figure 5:
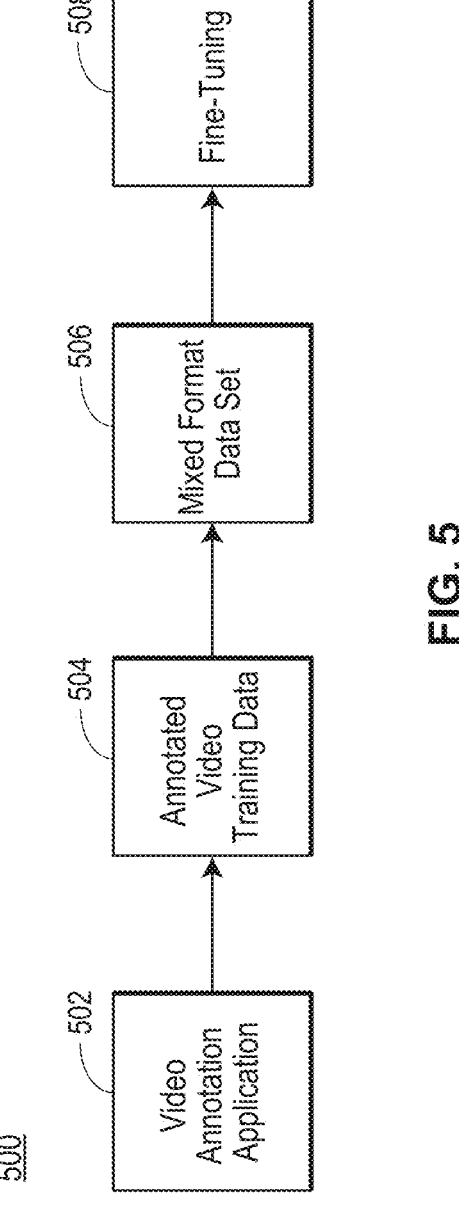
FIG. 5 depicts an example training flow of the model architecture.

FIG. 5 depicts an example training flow 500 to train one or more components of the model architecture 300. For ease of explanation, the example training flow 500 will be described with reference to components of the example system 100 of FIG. 1, the retail environment 200 of FIG. 2, and the model architecture 300 of FIG. 3, although the example training data flow may instead be implemented by other systems and/or in other surveillance environments. Each component of the model architecture 300 may be trained separately or in one process. Further, each component of the model architecture 300 may be separately fine-tuned or fine-tuned in one process. The video annotation application 502 may be the video annotation application 134 of FIG. 1, for example.

The video annotation application 502 may be configured at the start of the training flow 500. The video annotation application 502 enables a user to annotate/label frames of surveillance video, or portions of (e.g., specific pixel group-ings within) frames, as corresponding to particular events and/or particular event characteristics. Each field for anno-tation can be manually configured to fit different use cases, in some embodiments. For example, in a retail context, the configuration may include fields related to item concealment (e.g., number of customers, concealment types, suspect gender, suspect clothing, etc.), whereas in an industrial context the configuration may include fields related to workplace safety (e.g., number of supervisors, safety equip-ment worn, did any injures occur, etc.).

Annotated video training data 504 may be generated by the video annotation application 502 based on user inputs/annotations. Each training sample of annotated video train-ing data 504 may include a particular video frame or set of video frames, along with the corresponding annotation(s)/label(s) added by the user. The training samples of the annotated video training data 504 may function as ground truth when training the video encoder 304, connector mod-ule 306, and/or language model 308 (i.e., may indicate an expected result, regardless of whether the annotation is objectively correct/true), and/or as a knowledge base for the video encoder 304, connector module 306, and/or language model 308 to reference when analyzing video frames, depending on the embodiment. For training, for example, each component of the model architecture 300 may process that annotated training video to produce an output. The video encoder 304 extracts relevant frames, the connector module 306 transforms the frames, and the language model 308 produces an output. The monitoring application 132 may then compare the output from the language model 308 to the ground truth to determine a loss. The monitoring application 132 then back propagates the loss through both the language model 308 and video encoder 304 to adjust weights of their respective nodes.

The monitoring application 132 may train each compo-nent of the model architecture 300 using a mixed format data set 506. A mixed format training dataset is a dataset where the same ground truth is presented to each component the of the model architecture 300 in multiple different formats and/or representations during training. For example, the monitoring application 132 may train each component of the model architecture 300 using the same annotated training video sample, with annotations represented using a JSON object and a natural language format. In some embodiments, the monitoring application 132 employs a controlled mixing ratio. A controlled mixing ratio is a predetermined ratio that determines the makeup of the mixed format dataset.

In a specific embodiment, the controlled mixing ratio may include two types of training data. First, value-only anno-tated training samples may be included in the controlled mixing ratio. "Value-only" means that data is presented as pure values with no labels. For example, a video sample may show an item concealment event happening at the display areas 204. A value-only format for this event may be, for example, "1,0,Yes,cart,Female,Blue,Gray,No,No,105,230." Value-only annotated training samples use position values corresponding to the location of events and/or characteristics in a video sample to mark when they occur. The use of value-only training samples ensures higher accuracy for less common, but critical events and characteristics (e.g., item concealment, violence). Second, structured data-value anno-tated training samples may also be included in the controlled mixing ratio. Structured data-value annotated training samples are values that use consistent labeling and relation-ships. Each value has an associated label, consistent across the training data set. For example, a structured data-value sample may be a database table, a JSON object, an XML file, and/or a CSV file. The use of structured data-value samples provides flexible and production ready outputs and enables API integration. Using the example above, the JSON object for the video sample may be:

```
'''json
{"num\_customers": 1,
 "num\_staff": 0,
 "concealment": "Yes",
 "concealment\_type": "baby\_cart"}
```

In an illustrative embodiment, the monitoring application 132 may use a 70/30 mixing ratio of value-only to structured data-value samples for training. A mixed format data set 506, such as the 70/30 mixing ratio, may ensure the com-ponents of the model architecture 300 are trained to detect rare but important events and/or event characteristics. For example, in a group of ten thousand video samples, perhaps less than fifty may include a concealment event, correspond-ing to less than half a percent of video samples including this event. However, in the retail environment 200, item con-cealment may be a critical event for detection. To ensure the language model 308 still detects rare events, the monitoring application 132 may employ the controlled mixing ratio is used to reduce token dilution. In general, value-only data formats use less tokens than structured-value data formats. Using a higher ratio (e.g., 70%) of value-only data formats helps the language model 308 to learn rare events and/or event characteristics using fewer tokens. In addition, while the use of structured-data value formats generally use more tokens, this format may ensure the language model 308 is trained on how to format outputs, including both JSON objects and free-form text descriptions. Without a suffi-ciently high ratio of structured-value data formats, the language model 308 may be unable to accurately produce output formats and lose integration. The mixing ratio described herein is purely illustrative and not meant to be limiting in scope. Further mixing ratios may be envisioned and applied within the scope of the invention.

In some embodiments, the mixed format data set 506 includes question-answer (QA) pairs. QA pairs are questions or prompts with a corresponding answer or response. QA pairs may be both value-only and/or structured data-value QA pairs. The video-language model 135 may use QA pairs to learn the relationship between data values. In some embodiments QA pairs may be pre-defined. In addition, the language model 308 itself may parse through the mixed format dataset and generate QA pairs. The mixed format data set 506 may include both pre-defined and automatically generated QA pairs.

The monitoring application 132 may use the annotated video training data 504 in a mixed format data set 506 with QA pairs for fine-tuning 508 the video encoder 304, connector module 306, and/or language model 308. The monitoring application 132 may be fine-tuned to adapt the video encoder 304, connector module 306, and/or language model 308 to a specific domain or use case (e.g., retail focused, industrial focused). This enables use in a variety of surveillance environments 110. To fine-tune the video encoder 304, connector module 306, and/or language model 308 with the mixed format data set 506 with QA pairs, the monitoring application 132 may use a random number generator for each training iteration. The random number is used to determine whether a value-only sample or a structed-value sample is used for a certain iteration. For example, using the 70/30 mixing ratio, a random number below 0.7 would select a value-only sample and a random number at or above 0.7 would select a structured data sample. For each training iteration, the monitoring application 132 sends the question in a QA pair and the multimodal embedding corresponding to the data sample to the language model 308. The language model 308 then processes the question and uses the multimodal embeddings to output a corresponding answer. The monitoring application 132 then compares the answer the language model 308 outputs to the answer in the QA pair to determine the loss. After the loss is determined, monitoring application 132 updates the weights of all components of the model architecture 300 to account for the loss. In some embodiments, the model's weights are updated using an AdamW optimizer. Each component of the model architecture 300 may be fine-tuned for a selected number of epochs. An epoch is the number of iterations each component of the model architecture 300 is fine-tuned for. In some embodiments, the number of epochs corresponds to a configured loss threshold, (e.g., fine-tuning continues until the loss reaches a certain number).

In an illustrative example, the monitoring application 132 may fine-tune each component of the model architecture 300 using retail QA pairs. For example, the video encoder 304 may be trained on a publicly available video dataset (e.g., Kinetics) to understand general motion patterns and the language model 308 may be a pretrained LLM (e.g., Qwen 2.5), with the connector module 306 not needing any training. Further, the video annotation application 502 may have annotated five different video samples 502: (i) "Video A" depicting a customer hiding an item in a cart, (ii) "Video B" depicting a customer normally shopping, (iii) "Video C" depicting a crowded checkout, (v) "Video D" depicting a slip and fall, and (v) "Video E" depicting a staff member restocking a shelf. For ease of explanation, each video may have an associated QA pair. For example, the QA pairs may be "Describe any concealment activity" and "Yes, cart, Female, Blue, Gray, 105,230" for Video A, "Describe any concealment activity" and "No, none, Unknown, Unknown, Unknown, 0,0" for Video B, "How many customers are in the queue?" and "5 customers, 1 staff, average wait 3 minutes" For Video C, and "Describe any safety incidents" and "Yes, slip, aisle 3, Female, 45,60" for Video D, "Describe staff activity" and "1 staff restocking, aisle 5, dairy section" for Video E. At each epoch, the monitoring application 132 may provide each component of the model architecture 300 each video sample and the corresponding question, and the model architecture 300 may generate an answer as an output. Each output generated by the language model 308 of the model architecture 300 is compared to the ground truth answer from the QA pair, resulting in a quantified loss for each iteration. This quantified loss is then used by the monitoring application 132 to update the weights of the video encoder 304 and the language model 308. After a sufficient number of training epochs, each component of the model architecture 300 may be fine-tuned for retail specific applications, allowing for more accurate surveillance analysis in a retail environment 200. The same principles in this example may be applied to other surveillance environments 110 and/or with different QA pairs.

Fine-tuning 508 the video encoder 304 and the language model 308 may result in domain-specific components. As a result of the training flow 500, the video encoder 304 and the language model 308 may be configured to generate multiple output formats and detect rare but critical events and/or event characteristics while being tailored to a specific domain. This may ensure greater accuracy, usability, and adaptability to different use cases. The training flow 500 ensures that the monitoring application 132 may be applied to different use cases with unique surveillance environments 110 and associated events and/or event characteristics. In addition, the training flow 500 may train all components of the model architecture 300 together/jointly, minimizing error accumulation across training stages and ensuring all components of the model architecture 300 are optimized and trained for the same specific goal.

FIGS. 6A and 6B depict example user interfaces 602-A and 602-B, respectively, that may be generated and presented by the video annotation application 502. Each of the user interfaces 602-A and 602-B includes an image portion (604-A and 604-B, respectively) and a control portion (606-A and 606-B, respectively). Each of the control portions 606-A and 606-B includes a plurality of user-interactive control elements, including control elements for video selection and video playback (e.g., opening a folder, selecting a previous video, playing or pausing a video), control elements for saving annotations and/or advancing to particular videos or frames, and control elements for indicating particular depicted events and/or characteristics, for example.

For example, the user interface 602-A includes control elements (drop-down menus) that enable a user to select/indicate the number of customers and the number of staff, and a number of other control elements (checkboxes) that enable a user to select/indicate the presence of specific events or event characteristics such as "concealing," "assistant helping," "child in cart," "trolley in cart," and "wheelchair."

As another example, the user interface 606-B includes a control element (checkbox) for indicating potential concealment and the type of concealment (specifically, "bagging," "cloth hiding," or "baby cart hiding"). In addition, the user interface 606-B includes other control elements (text-entry fields and checkboxes) to describe characteristics of the suspect if there is any detected concealment. The example user interface 606-B also includes multiple sliders to capture the start and end frames for the concealment event and a text-entry field for describing any concealment evidence.

The examples presented in FIG. 6A and FIG. 6B are meant to be illustrative only and not limiting in scope. The video annotation application 502 may be highly configurable and may be adapted to a variety of use cases, surveillance environments 110 events, and/or event characteristics. For example, in the retail environment 200, the video annotation application 502 may be configured for an employee checkout station 210 with violence and/or aggression towards staff as the event and/or event characteristics (or as a subset of the event and/or event characteristics, etc.). In a different surveillance environment 110, such as an industrial environment, the video annotation application 502 may be configured for a workplace accident event with boxes directed event characteristics such as "safety equipment," and/or other similar event characteristics. Further configurations for different use cases, surveillance environments 110, events, and/or event characteristics may be envisioned within the scope of the invention.

VI. Exemplary Inference Pipeline

Figure 7:
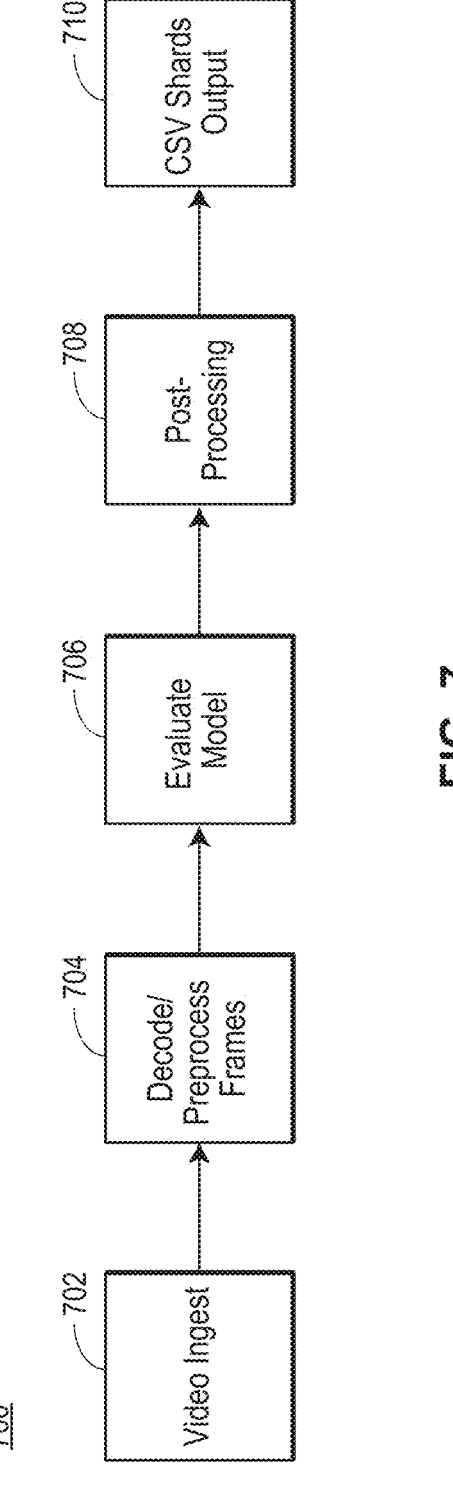
FIG. 7 depicts a block diagram of an example model inference pipeline.

FIG. 7 depicts a block diagram of an exemplary inference pipeline 700. For ease of explanation, the inference pipeline 700 will be described with reference to components of the example system 100 of FIG. 1, the retail environment 200 of FIG. 2, and the components of the model architecture 300 of FIG. 3, although the example training data flow may instead be implemented by other systems and in other surveillance environments. The computing system 102 leverages the inference pipeline 700 efficiently analyzes video datasets. Specifically, by implementing the inference pipeline 700, the monitoring application 132 may monitor live video streams effectively and efficiently without bottlenecking or delays. This capability may ensure effective surveillance, especially in use cases with multiple cameras and live video feeds.

At stage 702, the computing system 102 ingests one or more video files. The computing system 102 may ingest video through file paths and/or RTSP streams, for example. In some embodiments, video ingestion through file paths is from local storage (e.g., a physical server at the surveillance environment 110) or dedicated storage accessible via local networks (e.g., a storage device operably coupled to the computing system 102 via the network 106). The associated video files may be stored on local hard drives or redundant array of independent disks (RAIDs). If the computing system 102 is ingesting large video files, computing system 102 may employ batch processing to ingest multiple video files in parallel. In some embodiments, video files are stored via cloud storage (e.g., Amazon Webservices (AWS), Google Cloud). In still other embodiments, file storage is a hybrid combination of local and cloud-based storage. Video ingestion through RTSP streams requires the computing system 102 to connect to an RTSP server, via the network 106, which sends video in packets back to the computing system 102. These packets may also be ingested by the computing system 102 in batches.

At stage 704, the computing system 102, using a CPU (e.g., a CPU of the processing hardware 120 of FIG. 1), may decode the video frames. Decoding is the process of converting compressed video data into individual video frames. In general, most videos are compressed due to raw video sizes being impractically large for most hardware and/or software applications to efficiently manage. However, neural networks generally cannot process compressed videos and instead require uncompressed video to perform operations.

In some embodiments, the computing system 102 ingests video in batches to begin the decoding process. The inference pipeline 700 uses the CPU to decode videos, taking advantage of the CPU's hardware structure. Modern CPUs have multiple cores and threads. Using multiple threads for each core, a CPU can decode batches of videos in parallel. For each compressed video frame, the CPU may decode the compressed bits into pixels and store the pixels in a red-blue-green (RBG) array to store the decoded video frame. To reduce the storage size of the decoded frames, the CPU may employ temporal sampling to reduce the size of the video frames. Temporal sampling involves reducing redundant video frames to reduce file sizes and memory use. In some embodiments, temporal sampling is performed by the computing system 102 by uniformly selecting a random number of frames (e.g., every tenth video frame is kept). After the decoding process is finished, decoded frames may be output by the CPU in batches.

Video encoding may be performed by the CPU to offload decoding from the GPU and to prevent GPU bottlenecks. In some embodiments, GPUs are the most expensive computational resource. By preforming decoding on the CPU, GPU resources are freed for model evaluation. Further, offloading decoding operations to the CPU prevents bottlenecking by having the GPU decode frames and evaluate the model. This ensures faster model evaluation which may be critical for effective livestreams in a surveillance environment 110. Further, because decoding involves reading and writing data to memory, the task is suited better to the CPU's architecture.

Further at stage 704, the CPU may perform preprocessing on the decoded video frames. Preprocessing is necessary to convert decoded video frames into inputs readable by the 3D CNN 136. First, the CPU may resize video frames to fit the architectural requirements of 3D CNN's 136. Neural networks require specific input sizes to ensure consistency and compatibility between layers and trained datasets. Changing input sizes may require changing a neural network's architecture or retraining. For example, high-definition (HD) video formats have a resolution of 1920×1080 pixels, but the 3D CNN 136 may require a smaller resolution, such as 224×224 pixels. To accomplish this, the CPU may perform a video size reduction technique (e.g., bilinear interpolation, bicubic interpolation, nearest-neighbor) to reduce pixel size for compatibility with the 3D CNN 136. After the video frames have been resized, the CPU may then normalize pixel values from integers to normalized floats (e.g., transform each integer value to a float between 0 and 1). Normalized values may be necessary to match training data, improve neural network performance, and create numerical stability. The CPU may use a suitable technique (e.g., ImageNet statistics) to normalize the pixel values.

In further embodiments, preprocessing includes the CPU organizing video frames into structured tensors for batch processing. The 3D CNN 136 may require video frames to be encoded into specific tensor types. For example, the 3D CNN 136 may require a tensor input of "[batch, frames, channels, height, width]." Before the CPU may send the data to the 3D CNN 136, the data must be organized into this format. In addition, batching may allow for more efficient GPU processing once the video frames are sent by the CPU to the 3D CNN 136 because the GPU can process the batch in one entire operation.

The CPU may perform preprocessing to reserve GPU (e.g., a GPU of the processing hardware 120 of FIG. 1) resources for critical operations, such as inferencing. Further, preprocessing by the CPU provides a more efficient pipeline. The use parallel operations provide for maximum throughput and prevents bottlenecks caused by GPU pre-processing. In addition, CPU preprocessing is more flexible, allowing for modification of any steps of the preprocessing process without GPU memory constraints.

At stage 706, the computing system 102 using a GPU (e.g., a GPU of the processing hardware 120 of FIG. 1) may evaluate the video encoder 304, connector module 306, and/or language model 308. Before the GPU may evaluate these components, host-to-device transfer must be employed by the computing system 102 to transfer the preprocessed video frames from the CPU to the GPU. This is necessary because the CPU does not share the same memory as the GPU. The CPU uses general purpose RAM, whereas the GPU uses its own dedicated video random access memory (VRAM). In some embodiments, the host-to-device transfer is accomplished through the use of a system bus.

After host-to-device transfer at stage 706 the GPU evaluates the model. The first stage of model evaluation requires executing the video encoder 304. Using the input tensor of preprocessed video frames, the GPU executes the video encoder 304 to perform convolution, pooling, and self-attention operations. In some embodiments, these operations may be performed in parallel by the GPU across computations. After the operations are performed by the video encoder 304, the input tensor of video frames is converted into spatiotemporal embeddings by the video encoder 304. The spatiotemporal embeddings are stored in the GPU's VRAM, before being passed to the connector module 306.

Performing neural network operations on the GPU takes advantage of system hardware limitations. A CPU has far fewer cores compared to a GPU, allowing GPUs to accomplish numerous quantities of parallel tasks more efficiently than a CPU. Further, when performing neural network operations, the GPU is able to perform single instruction multiple data (SIMD) operations, allowing for faster processing. In addition, GPUs may have higher memory bandwidth than CPUs, providing for higher throughput. In some embodiments, a GPU has specialized hardware, allowing for even more efficient neural network operations.

At stage 706, the computing system 102 uses the GPU to send the spatiotemporal embeddings to the connector module 306. The connector module 306 projects the spatiotemporal embeddings generated by the video encoder 304 into a multimodal latent space, resulting in a set of multimodal embeddings. To create this projection, the connector module 306 directs the GPU to perform linear transformation and normalization operations on the spatiotemporal embeddings. In some embodiments, the GPU performs these operations in parallel. This stage of the inference pipeline 700 takes advantage of GPU architecture to perform projections and normalizations in parallel, allowing for fast and efficient processing time. Further, all components of the model architecture 300 are stored in GPU memory, creating low latency when transferring data between the video encoder 304 and the language model 308.

At stage 706, the third step of model evaluation by the GPU is sending the multimodal embeddings to the language model 308. At this stage, multimodal embeddings are stored in GPU memory. In some embodiments, pre-configured text prompts are also stored in GPU memory. At this stage, the language model 308 directs the GPU to execute transformer layers to generate outputs based on the multimodal embeddings and associated prompts. While the language model 308 must generate tokens and pass each token through layers sequentially, the inference pipeline 700 is still able to take advantage of GPU architecture by batch processing many multimodal embeddings in parallel. In some embodiments, all the weights of a model are stored in the GPU, allowing for fast access during computations and reducing bottlenecks. In addition, a GPU may have higher memory bandwidth, which ensures faster performance. For example, generating a token may require repeated model weight reads. Performing this on a GPU with higher memory bandwidth may allow for faster token generation, improving overall performance.

At stage 708, post-processing is performed by the CPU. Initially, this may require the GPU using a system bus to transfer language model 308 outputs to CPU memory. The CPU may then perform many post-processing operations as directed by the language model 308. For example, the CPU may parse text generated by the language model 308. Parsing may include comma-separating value-only data formats and/or populating values to fields (e.g., associating the integer "2" with the field "number of customers"). In addition, the CPU may perform operations to structure the output format (e.g., format the output into a JSON object) and/or generate a free-form text description of the output that is human-readable. The inference pipeline 700 at this stage may use a CPU because text operations may not be performed in parallel. CPU architecture is generally suited for sequential operations. Further, post-processing uses smaller data sizes, which a CPU may handle efficiently. In addition, the use of a CPU for post-processing may free up the GPU for inferences on a subsequent batch of video frames, preventing overall computing system 102 bottlenecks and allowing for fast performance.

At stage 710, the computing system 102 may use the CPU to write the structure results to comma-separated value (CSV) shards. Sharding is the process of splitting one file into multiple smaller files. The CPU shards files so that multiple batches may be written and read in parallel. In addition, the use of CSV shards by the CPU ensures efficient post-processing. The inference pipeline 700 uses a CPU at this stage because CPU architecture may handle read/write and sequential operations more efficiently.

VII. Example Methods

Figure 8:
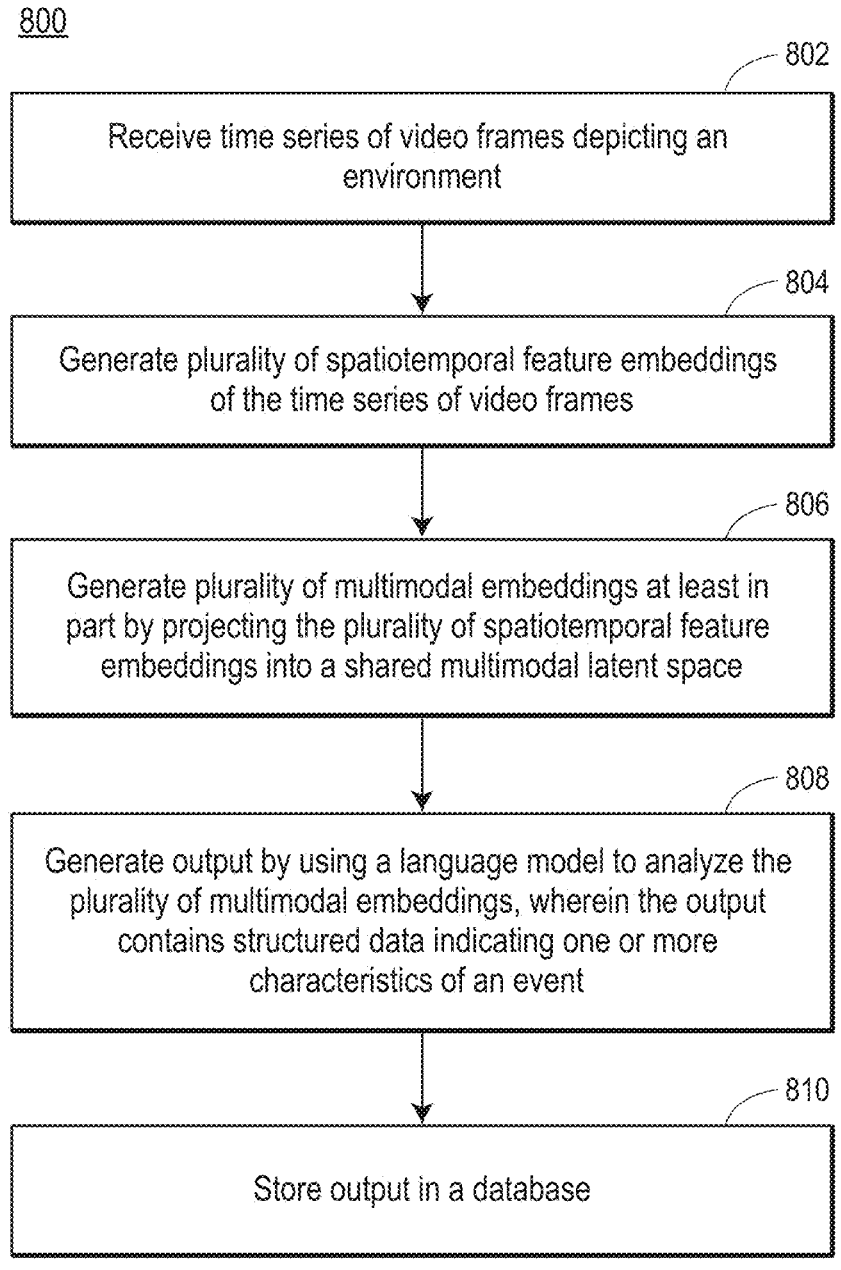
FIG. 8 is a flow diagram of an example method of automated surveillance analysis.

FIG. 8 is a flow diagram of an example method 800 for automated surveillance analysis. The method 800 may be implemented, in whole or in part, by one or more components of the example system 100 of FIG. 1 and one or more components of FIG. 3 (e.g., the method may be performed by the processing hardware 120 when executing the instructions of the monitoring application 132).

At block 802, a time series of video frames is received. The video frames depict an area of interest in a surveillance environment (e.g., surveillance environment 110). For example, in the retail environment 200 of FIG. 2, this may be the display areas 204, employee checkout station 210, and/or the self-checkout stations 220. In a different surveillance environment, such as an industrial environment, the time series of video frames may depict a different area of interest, such as an assembly line, a warehouse, and/or a loading dock.

At block 804 a plurality of spatiotemporal feature embeddings of the time series of video frames are generated using the video encoder (e.g., video encoder 304). Block 804 may include extracting, from each video frame, spatial features (e.g., objects, shapes) and temporal features (e.g., motion, actions). For example, if a video frame depicts an item concealment, the product being concealed and the person concealing the product may be the extracted spatial features, and the motion of concealing the product may be the temporal features. In some embodiments, Block 804 includes a 3D CNN (e.g., 3D CNN 136) using self-attention layers to capture temporal dependencies between objects. For example, a time series of video frames depicting an item concealment event may include, in one frame, a hand near a shelf and another hand near a bag. Self-attention then enables the 3D CNN understand that the same hand that is located near the shelf and is also located near the bag, indicating item concealment. One spatiotemporal feature embedding may be generated for each frame in the time series of video frames.

At block 806, a plurality of multimodal embeddings are generated by a connector module (e.g., connector module 306) at least in part by projecting the plurality of spatiotemporal feature embeddings into a shared multimodal latent space. Block 806 includes using the connector module to transform the spatiotemporal feature into an embedding space where both visual and text information can be processed together. In some embodiments, this projection is done by transforming the spatiotemporal feature embeddings using linear projection and normalization. The result of the linear transformation and normalization comprises multimodal embeddings.

At block 808, an output is generated by using a language model (e.g., language model 308) to analyze the plurality of multimodal embeddings. Block 808 may include combining the multimodal embeddings with a text prompt to generate the output (e.g., output 310). In some embodiments, the output indicates one or more characteristics of an event. For example, in some embodiments the event includes an item selection event, an item concealment event, a self-checkout event, a cashier checkout event, an item restocking event, a customer assistance event, and/or a staff maintenance event. In further embodiments, the event characteristics include characteristics indicative of a concealment mechanism, characteristics indicative of clothing worn, characteristics indicative of gender, characteristics indicative of hair color, characteristics of clothing, or characteristics of personal affects. Block 808 may also include an output comprising structured data indicating the characteristics of an event. For example, in some embodiments, output includes a JSON object, wherein the JSON object which indicates the context of the event, activity detected during the event, and/or temporal information associated with the event. In further embodiments, the output includes a free-form text description comprising descriptions of the context of the event, activity detected during the event, or temporal information associated with the event. In even further embodiments, the language model generates the free-form text description from the JSON object.

At block 810, the output (e.g., output 310) may be stored in a database (e.g., the event database 144 of FIG. 1). Block 810 may include storing the output as CSV shards. The stored output may include metadata (e.g., a video ID, a timestamp) and the event characteristics. In some embodiments, storing the output in a database makes the results available for further analysis or physical action (e.g., an alert, an automated door lock, etc.).

Blocks 802, 804, 806, and 808 may occur repeatedly, e.g., substantially in real-time as subsequent video frames or sets of video frames are received at block 802. For example, blocks 804, 804, and 806 may be repeated for each video frame, and block 810 may be repeated for each set of N video frames (e.g., with N=10, 100, etc., or with N varying depending on factors such as how many successive frames depict a particular event and/or event characteristic).

VIII. Examples

The following list of examples reflects a variety of the embodiments explicitly contemplated by the present disclosure.

Example 1. A computer-implemented method for automated surveillance analysis, the computer-implemented method comprising: receiving, by one or more processors, a time series of video frames depicting an environment; generating, by the one or more processors and using a three-dimensional (3D) convolutional neural network, a plurality of spatiotemporal feature embeddings of the time series of video frames; generating, by the one or more processors, a plurality of multimodal embeddings at least in part by projecting the plurality of spatiotemporal feature embeddings into a shared multimodal latent space; generating, by the one or more processors, an output by using a language model to analyze the plurality of multimodal embeddings, wherein the output contains structured data indicating one or more characteristics of an event; and storing, by the one or more processors, the output in a database.

Example 2. The computer-implemented method of example 1, wherein the output includes a JavaScript Object Notation (JSON) object, wherein the JSON object is indicative of one or more of (i) context of the event, (ii) activity detected during the event, or (iii) temporal information associated with the event.

Example 3. The computer-implemented method of example 2, wherein the output further includes a free-form text description comprising one or more of (i) descriptions of the context of the event, (ii) activity detected during the event, or (iii) temporal information associated with the event.

Example 4. The computer-implemented method of example 3, wherein generating the output comprises: generating, using the language model, the free-form text description based on the JSON object.

Example 5. The computer-implemented method of any of examples 1-4, further comprising: generating, by the one or more processors and based on user inputs entered via a video annotation application, annotated video training data; and training, by the one or more processors, the language model using the annotated video training data.

Example 6. The computer-implemented method of example 5, wherein the video annotation application provides text entry fields for user-configurable video annotation schemas.

Example 7. The computer-implemented method of any of examples 1-6, further comprising: training, by the one or more processors, the language model using a controlled ratio of value-only annotated video training data samples to structured data-value annotated video training data samples.

Example 8. The computer-implemented method of example 7, further comprising: fine-tuning, by the one or more processors, the language model based on retail-focused question-answer pairs.

Example 9. The computer-implemented method of any of examples 1-8, wherein the event includes (i) an item selection event, (ii) an item concealment event, (iii) a self-checkout event, (iv) a cashier checkout event (v) an item restocking event, (vi) a customer assistance event, or (vii) a staff maintenance event.

Example 10. The computer-implemented method of any of examples 1-9, wherein the one or more characteristics of the event include one or more (i) characteristics indicative of a concealment mechanism, (ii) characteristics indicative of clothing worn, (iii) characteristics indicative of gender, (iv) characteristics indicative of hair color, (v) characteristics of clothing, or (vi) characteristics of personal affects.

Example 11. A computing system comprising: one or more processors; and memory storing instructions that, when executed by the one or more processors, cause the computing system to: receive a time series of video frames depicting an environment; generate, using a three-dimensional (3D) convolutional neural network, a plurality of spatiotemporal feature embeddings of the time series of video frames; generate a plurality of multimodal embeddings at least in part by projecting the plurality of spatiotemporal feature embeddings into a shared multimodal latent space; generate an output by using a language model to analyze the plurality of multimodal embeddings, wherein the output contains structured data indicating one or more characteristics of an event; and store the output in a database.

Example 12. The computing system of example 11, wherein the output includes a JavaScript Object Notation (JSON) object, wherein the JSON object is indicative of one or more of (i) context of the event, (ii) activity detected during the event, or (iii) temporal information associated with the event.

Example 13. The computing system of example 12, wherein the output further includes a free-form text description comprising one or more of (i) descriptions of the context of the event, (ii) activity detected during the event, or (iii) temporal information associated with the event.

Example 14. The computing system of example 13, wherein generating the output comprises: generate, using the language model, the free-form text description based on the JSON object.

Example 15. The computing system of any of examples 11-14, further comprising: generate based on user inputs entered via a video annotation application, annotated video training data; and train the language model using the annotated video training data.

Example 16. The computing system of example 15, wherein the video annotation application provides text entry fields for user-configurable video annotation schemas.

Example 17. The computing system of any of examples 11-16, further comprising: train the language model using a controlled ratio of value-only annotated video training data samples to structured data-value annotated video training data samples.

Example 18. The computing system of example 17, further comprising: fine-tune the language model based on retail-focused question-answer pairs.

Example 19. The computing system of any of examples 11-18, wherein the event includes (i) an item selection event, (ii) an item concealment event, (iii) a self-checkout event, (iv) a cashier checkout event (v) an item restocking event, (vi) a customer assistance event, or (vii) a staff maintenance event.

Example 20. The computing system of any of examples 11-19, wherein the one or more characteristics of the event include one or more (i) characteristics indicative of a concealment mechanism, (ii) characteristics indicative of clothing worn, (iii) characteristics indicative of gender, (iv) characteristics indicative of hair color, (v) characteristics of clothing, or (vi) characteristics of personal affects.

Example 21. A computer-readable non-transitory storage medium comprising executable instructions that, when executed by a computer system, cause the computer system to: receive a time series of video frames depicting an environment; generate, using a three-dimensional (3D) convolutional neural network, a plurality of spatiotemporal feature embeddings of the time series of video frames; generate a plurality of multimodal embeddings at least in part by projecting the plurality of spatiotemporal feature embeddings into a shared multimodal latent space; generate an output by using a language model to analyze the plurality of multimodal embeddings, wherein the output contains structured data indicating one or more characteristics of an event; and store the output in a database.

Example 22. The computer-readable non-transitory storage medium of example 21, wherein the output includes a JavaScript Object Notation (JSON) object, wherein the JSON object is indicative of one or more of (i) context of the event, (ii) activity detected during the event, or (iii) temporal information associated with the event.

Example 23. The computer-readable non-transitory storage medium of example 22, wherein the output further includes a free-form text description comprising one or more of (i) descriptions of the context of the event, (ii) activity detected during the event, or (iii) temporal information associated with the event.

Example 24. The computer-readable non-transitory storage medium of example 23, wherein generating the output comprises: generate, using the language model, the free-form text description based on the JSON object.

Example 25. The computer-readable non-transitory storage medium of any of examples 21-24, further comprising: generate based on user inputs entered via a video annotation application, annotated video training data; and train the language model using the annotated video training data.

Example 26. The computer-readable non-transitory storage medium of example 25, wherein the video annotation application provides text entry fields for user-configurable video annotation schemas.

Example 27. The computer-readable non-transitory storage medium of examples 21-26, further comprising: train the language model using a controlled ratio of value-only annotated video training data samples to structured data-value annotated video training data samples.

Example 28. The computer-readable non-transitory storage medium of example 27, further comprising: fine-tune the language model based on retail-focused question-answer pairs.

Example 29. The computer-readable non-transitory storage medium of any of examples 21-28, wherein the event includes (i) an item selection event, (ii) an item concealment event, (iii) a self-checkout event, (iv) a cashier checkout event (v) an item restocking event, (vi) a customer assistance event, or (vii) a staff maintenance event.

Example 30. The computer-readable non-transitory storage medium of any of examples 21-29, wherein the one or more characteristics of the event include one or more (i) characteristics indicative of a concealment mechanism, (ii) characteristics indicative of clothing worn, (iii) characteristics indicative of gender, (iv) characteristics indicative of hair color, (v) characteristics of clothing, or (vi) characteristics of personal affects.

XI. Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for monitoring and tracking interactions with inventory in a retail environment, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method for automated surveillance analysis, the computer-implemented method comprising:
    training, by one or more processors, a language model using a controlled ratio of value-only annotated video training data samples to structured data-value annotated video training data samples;
    receiving, by the one or more processors, a time series of video frames depicting an environment;
    generating, by the one or more processors and using a three-dimensional (3D) convolutional neural network, a plurality of spatiotemporal feature embeddings of the time series of video frames;

generating, by the one or more processors, a plurality of multimodal embeddings at least in part by projecting the plurality of spatiotemporal feature embeddings into a shared multimodal latent space;
    generating, by the one or more processors, an output by using the language model to analyze the plurality of multimodal embeddings, wherein the output includes structured data indicating one or more characteristics of an event; and
    storing, by the one or more processors, the output in a database.

2. The computer-implemented method of claim 1, wherein the output includes a JavaScript Object Notation (JSON) object, wherein the JSON object is indicative of one or more of (i) context of the event, (ii) activity detected during the event, or (iii) temporal information associated with the event.

3. The computer-implemented method of claim 2, wherein the output further includes a free-form text description comprising one or more of (i) descriptions of the context of the event, (ii) activity detected during the event, or (iii) temporal information associated with the event.

4. The computer-implemented method of claim 3, wherein generating the output comprises:
    generating, using the language model, the free-form text description based on the JSON object.

5. The computer-implemented method of claim 1, further comprising:
    generating, by the one or more processors and based on user inputs entered via a video annotation application, annotated video training data; and
    training, by the one or more processors, the language model using the annotated video training data.

6. The computer-implemented method of claim 5, wherein the video annotation application provides text entry fields for user-configurable video annotation schemas.

7. The computer-implemented method of claim 1, further comprising:
    fine-tuning, by the one or more processors, the language model based on retail-focused question-answer pairs.

8. The computer-implemented method of claim 1, wherein the event includes (i) an item selection event, (ii) an item concealment event, (iii) a self-checkout event, (iv) a cashier checkout event, (v) an item restocking event, (vi) a customer assistance event, or (vii) a staff maintenance event.

9. The computer-implemented method of claim 1, wherein the one or more characteristics of the event include one or more (i) characteristics indicative of a concealment mechanism, (ii) characteristics indicative of clothing worn, (iii) characteristics indicative of gender, (iv) characteristics indicative of hair color, (v) characteristics of clothing, or (vi) characteristics of personal affects.

10. A computing system comprising:
    one or more processors; and
    memory storing instructions that, when executed by the one or more processors, cause the computing system to:
        train a language model using a controlled ratio of value-only annotated video training data samples to structured data-value annotated video training data samples;
        receive a time series of video frames depicting an environment;

generate, using a three-dimensional (3D) convolutional neural network, a plurality of spatiotemporal feature embeddings of the time series of video frames;

generate a plurality of multimodal embeddings at least in part by projecting the plurality of spatiotemporal feature embeddings into a shared multimodal latent space;

generate an output by using the language model to analyze the plurality of multimodal embeddings, wherein the output includes structured data indicating one or more characteristics of an event; and store the output in a database.

11. The computing system of claim 10, wherein the output includes a JavaScript Object Notation (JSON) object, wherein the JSON object is indicative of one or more of (i) context of the event, (ii) activity detected during the event, or (iii) temporal information associated with the event.

12. The computing system of claim 10, wherein the instructions further cause the computing system to:

generate, based on user inputs entered via a video annotation application, annotated video training data; and train the language model using the annotated video training data.

13. The computing system of claim 10, wherein the instructions further cause the computing system to:

fine-tune the language model based on retail-focused question-answer pairs.

14. A computer-readable non-transitory storage medium comprising executable instructions that, when executed by a computer system, cause the computer system to:

train a language model using a controlled ratio of value-only annotated video training data samples to structured data-value annotated video training data samples;

receive a time series of video frames depicting an environment;

generate, using a three-dimensional (3D) convolutional neural network, a plurality of spatiotemporal feature embeddings of the time series of video frames;

generate a plurality of multimodal embeddings at least in part by projecting the plurality of spatiotemporal feature embeddings into a shared multimodal latent space;

generate an output by using the language model to analyze the plurality of multimodal embeddings, wherein the output includes structured data indicating one or more characteristics of an event; and store the output in a database.

15. The computer-readable non-transitory storage medium of claim 14, wherein the output includes a JavaScript Object Notation (JSON) object, wherein the JSON object is indicative of one or more of (i) context of the event, (ii) activity detected during the event, or (iii) temporal information associated with the event.

16. The computer-readable non-transitory storage medium of claim 14, wherein the executable instructions further cause the computer system to:

Generate, based on user inputs entered via a video annotation application, annotated video training data; and train the language model using the annotated video training data.

17. The computer-readable non-transitory storage medium of claim 14, wherein the executable instructions further cause the computer system to:

fine-tune the language model based on retail-focused question-answer pairs.

18. The computer-implemented method of claim 1, further comprising:

causing, by the one or more processors and based on the output, an external device to perform an action by transmitting a control signal to the external device.

19. The computing system of claim 10, wherein the instructions further cause the computing system to:

cause, based on the output, an external device to perform an action by transmitting a control signal to the external device.

20. The computer-readable non-transitory storage medium of claim 14, wherein the executable instructions further cause the computer system to:

cause, based on the output, an external device to perform an action by transmitting a control signal to the external device.

* * * * *